US011548427B1

(12) United States Patent
Shanmuga Sundaram

(10) Patent No.: US 11,548,427 B1
(45) Date of Patent: Jan. 10, 2023

(54) VEHICLE WITH FLOOR AREA HAVING PERFORATIONS

(71) Applicant: Zoox, Inc., Foster City, CA (US)

(72) Inventor: Goutham Shanmuga Sundaram, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/351,945

(22) Filed: Jun. 18, 2021

(51) Int. Cl.
*B60S 1/64* (2006.01)
*B60N 3/04* (2006.01)
*B60N 3/08* (2006.01)

(52) U.S. Cl.
CPC ............... *B60N 3/048* (2013.01); *B60S 1/64* (2013.01); *B60N 3/08* (2013.01)

(58) Field of Classification Search
None
See application file for complete search history.

(56) References Cited

U.S. PATENT DOCUMENTS 6,547,301 B1 * 4/2003 Keller ............... B60H 1/00564
165/42

FOREIGN PATENT DOCUMENTS

KR 20180106864 * 10/2018

OTHER PUBLICATIONS

Machine translation of KR20180106864 (Year: 2022).*

* cited by examiner

*Primary Examiner* — Alexander S Thomas
(74) *Attorney, Agent, or Firm* — EIP US LLP

(57) ABSTRACT

A vehicle floor area may include a body and a floor. The floor may be attached to and positioned at least partially above the body. The floor may comprise floor perforations. A collection receptacle may be supported by the body and positioned at least partially below the floor so that solid waste or liquid waste can fall through the floor perforations onto the collection receptacle. The waste that has fallen onto the collection receptacle may be removed from the collection receptacle.

13 Claims, 12 Drawing Sheets

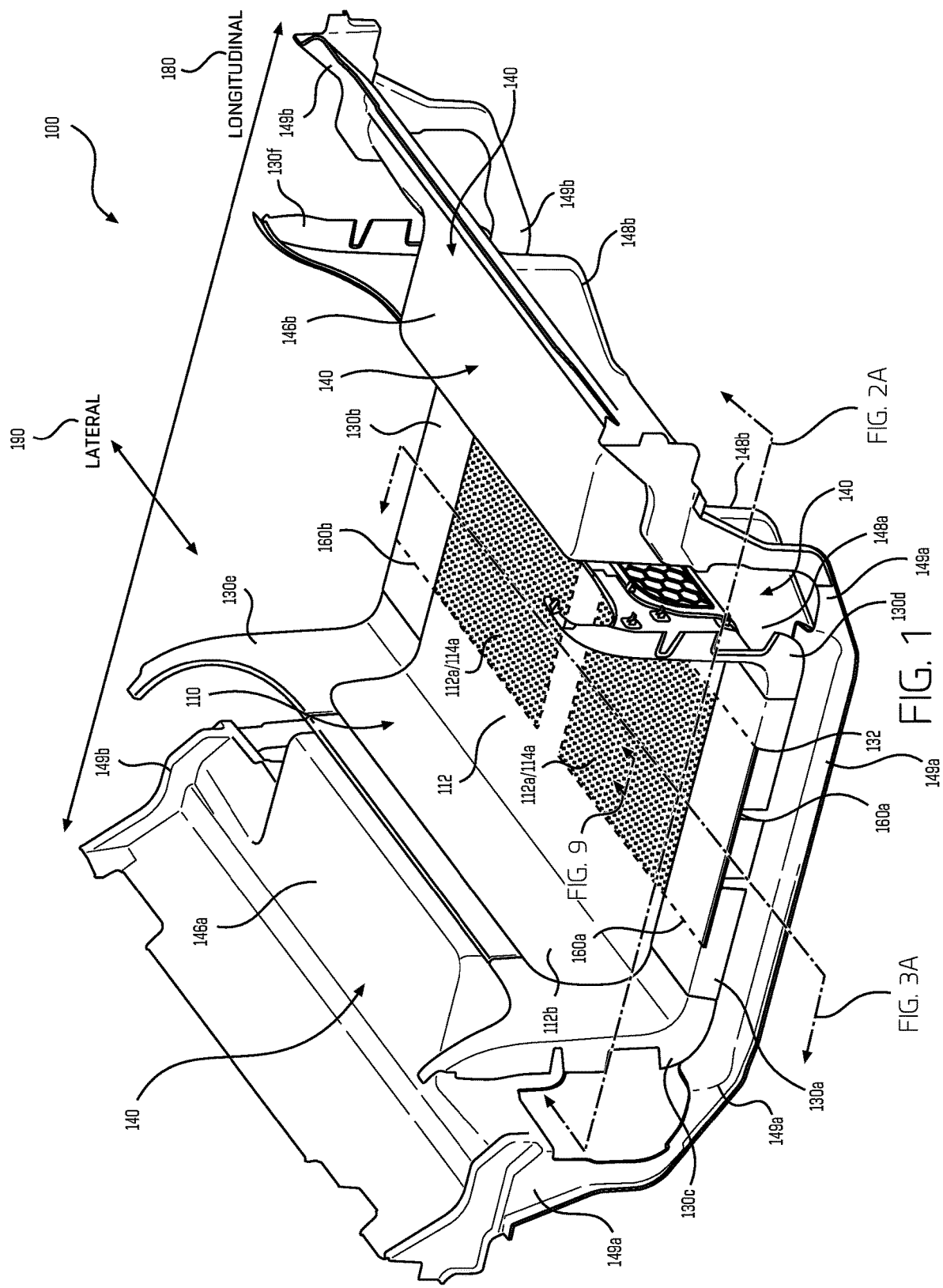

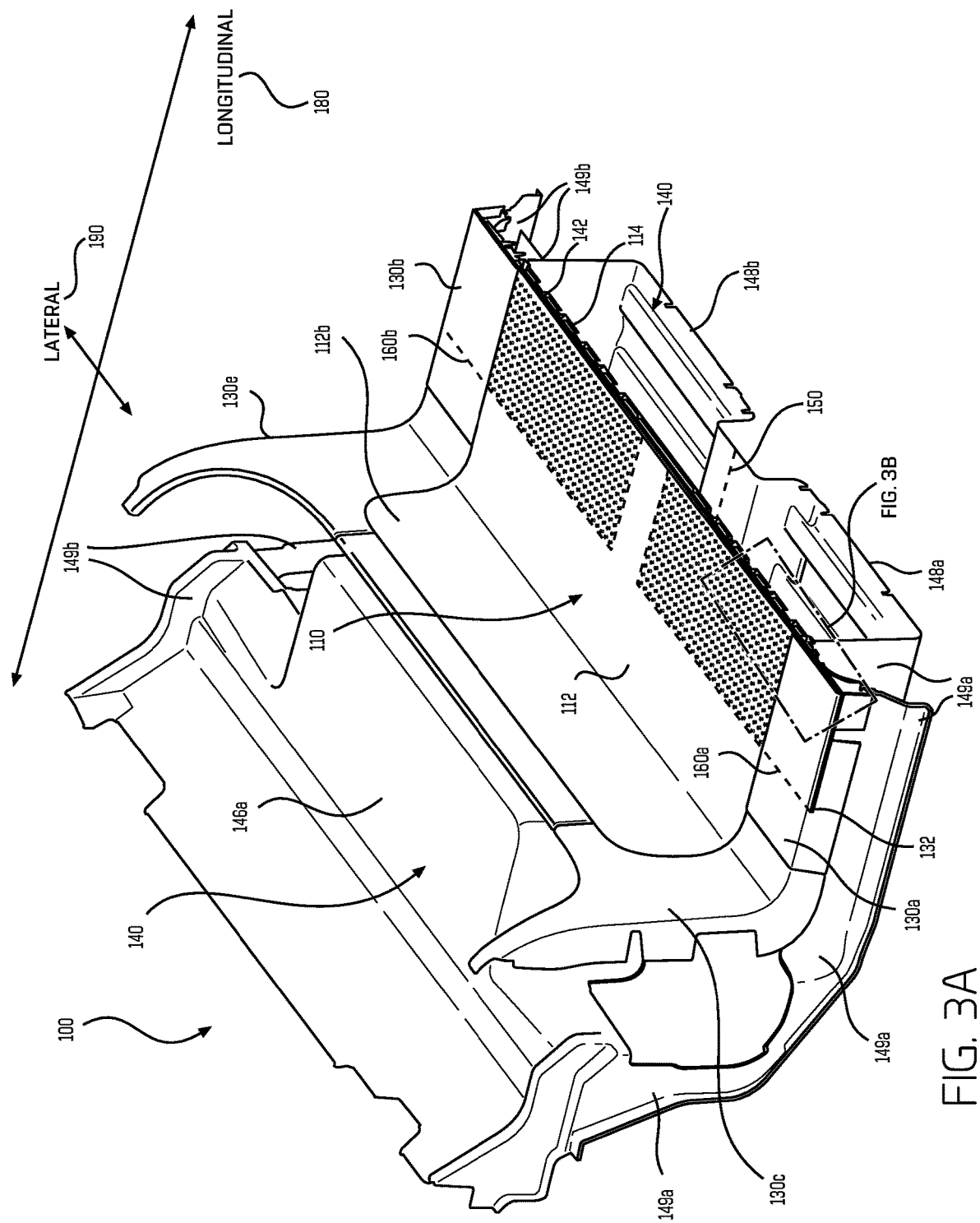

VEHICLE WITH FLOOR AREA HAVING PERFORATIONS

BACKGROUND

People desire cleanliness inside vehicles. Dust, debris, and liquid waste that accumulates on the floor inside a vehicle may be cleaned by vacuuming, hosing and/or or wiping the surface.

BRIEF DESCRIPTION OF DRAWINGS

The detailed description is described with reference to the accompanying figures. The use of the same reference numbers in different figures indicates similar or identical components or features.

FIG. 1 is a perspective view of an example vehicle floor area of the present disclosure.

FIG. 3A is another perspective sectional view of the vehicle floor area of FIG. 1.

DETAILED DESCRIPTION

The present application relates to vehicles having floor areas with perforations. The vehicle floor areas can be structured and arranged to maintain a visibly clean surface of a floor inside the vehicle. In various examples, the vehicle floor area comprises a body and a floor. The floor may have a rigid bottom substrate attached to a top layer or mat. The top layer or mat may have a plurality of mat perforations. Each mat perforation may comprise a diameter in the range of, for example, 0.5 mm to 2.0 mm. The bottom rigid substrate may have a plurality of substrate perforations that are substantially aligned with the mat perforations. Each substrate perforation may comprise a diameter in the range of, for example, 0.5 mm to 2.0 mm. In some examples, the substrate perforations may comprise a diameter in the range of 0.5 mm to 4.0 mm. The body may comprise a floor support rising upwardly from a bottom or base portion of the body. The floor may be attached to the floor support at a position substantially above the floor support. The floor support, in certain examples, includes first and second support guides at a first lateral side of the body, and third and fourth support guides at a second lateral side of the body. Each of the support guides in various examples may include laterally extending rails. A first collection tray may be supported by the first and second support guides at the first lateral side and positioned at least partially below the rigid substrate of the floor so that solid waste or fluid waste can fall through the mat and substrate perforations onto the first collection tray. A second collection tray may be supported by the third and fourth support guides at the second lateral side of the body and positioned at least partially below the rigid substrate so that solid waste or fluid waste can fall through the mat and substrate perforations onto the second collection tray.

When the vehicle is operating, the natural vibrations of the vehicle can create a sieving type of action at the floor area to cause any waste or debris that may have fallen onto a top surface of the mat (e.g., onto a surface area of the mat located between each mat perforation) to fall through the mat and substrate perforations onto the first and second collection trays. The first and second collection trays may be accessible from side door end portions of the vehicle and may be manually pulled out from their support guides so that any waste or debris that has fallen onto the collection trays can be removed from the collection trays. The clean collection trays can then be inserted back into their respective support guides to collect further debris. It should therefore be appreciated that in various examples, the vehicle and vehicle floor areas described herein help maintain a visually clean top surface of the vehicle floor.

Figure 2A:
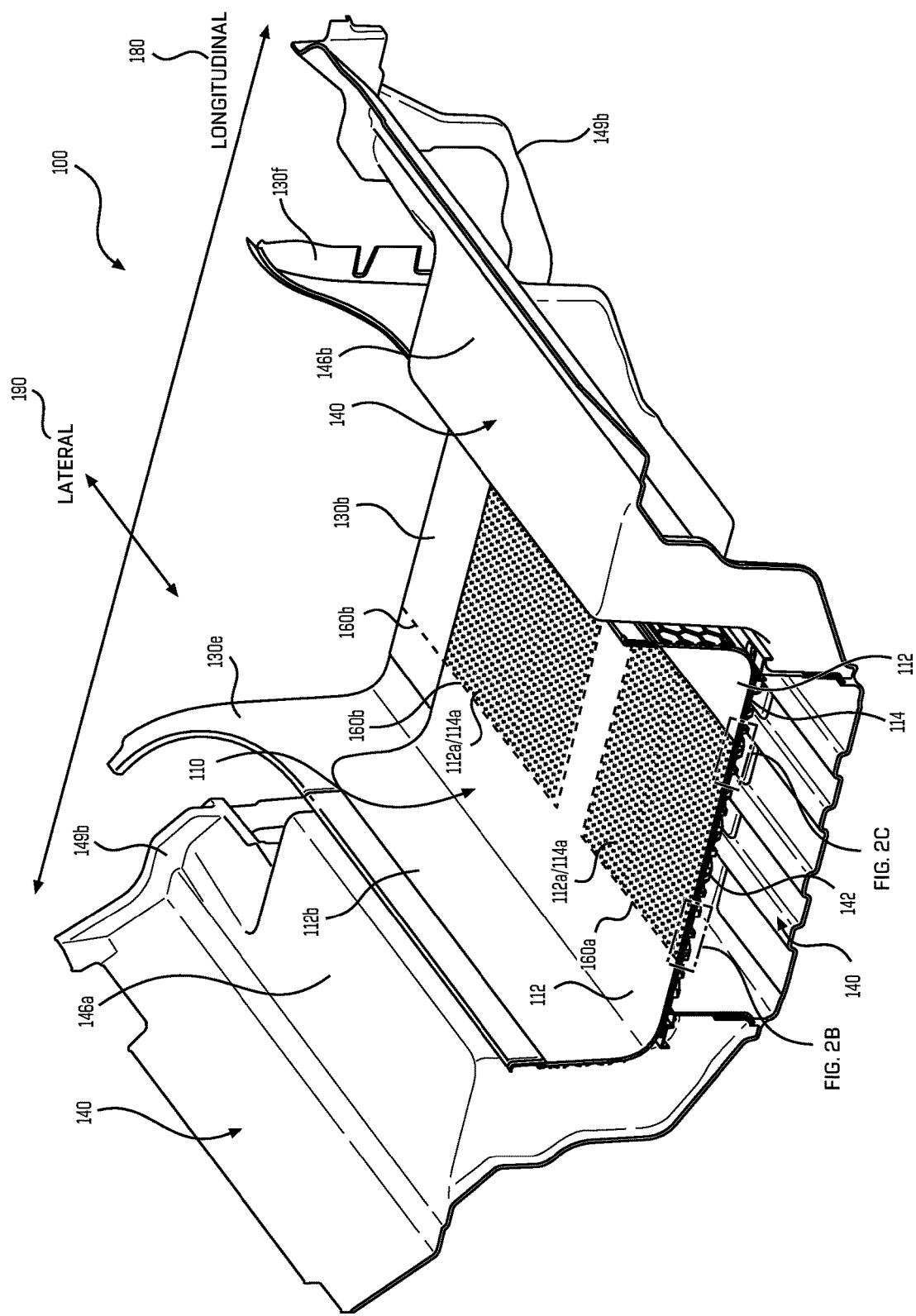
FIG. 2A is a perspective sectional view of the vehicle floor area of FIG. 1.
Figure 2B:
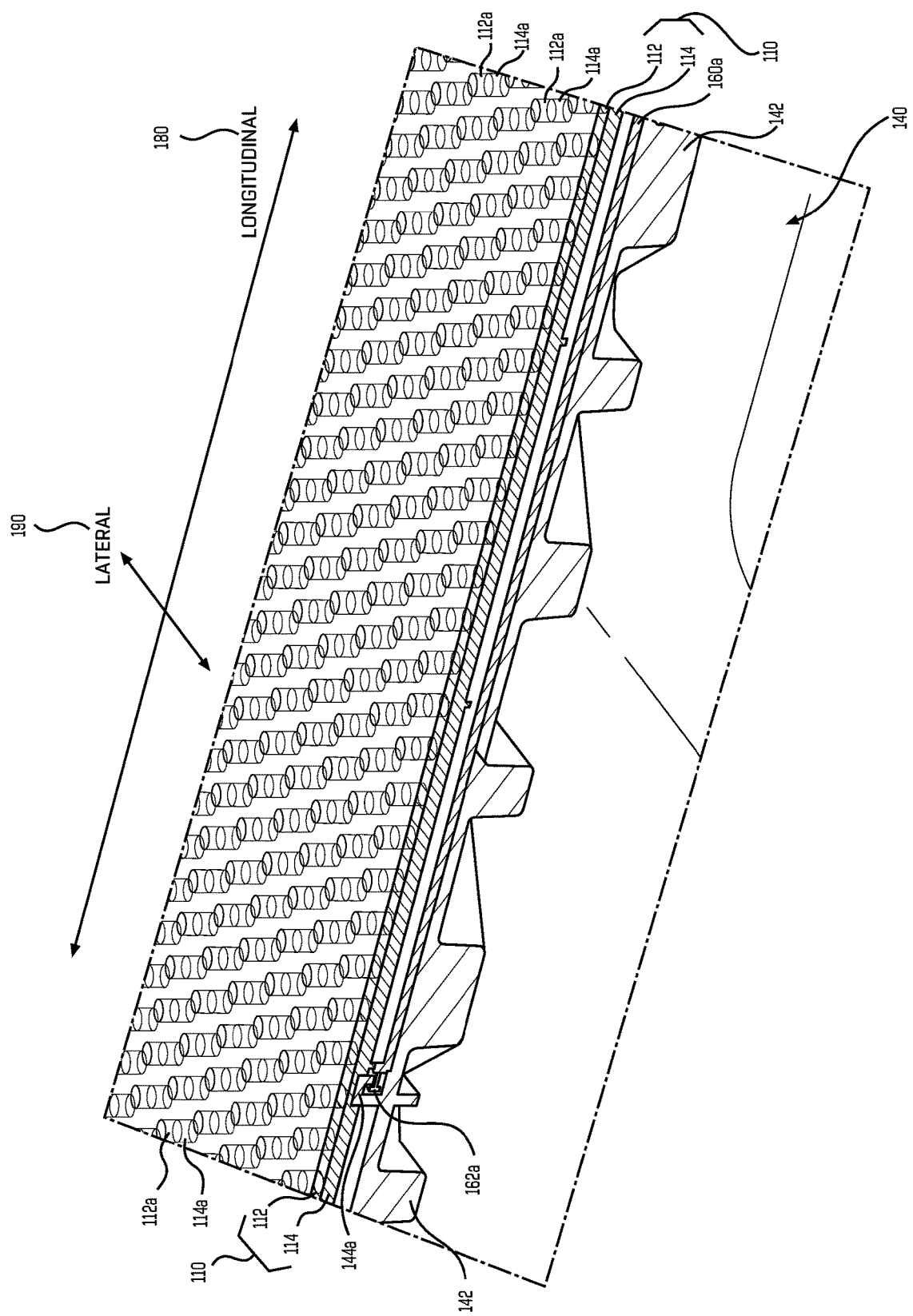
FIG. 2B is an enlarged view of a portion of FIG. 2A.
Figure 2C:
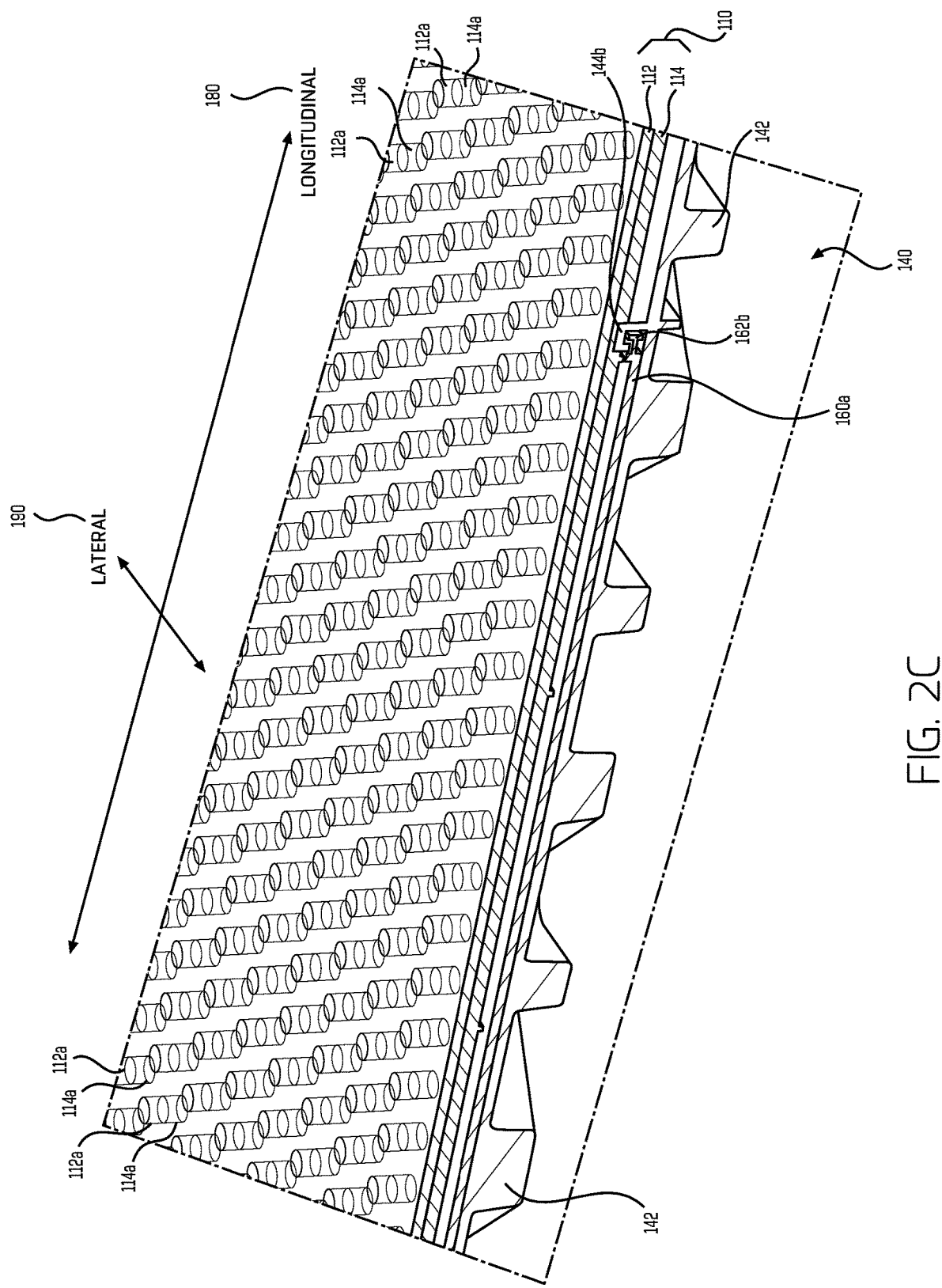
FIG. 2C is an enlarged view of another portion of FIG. 2A.
Figure 3B:
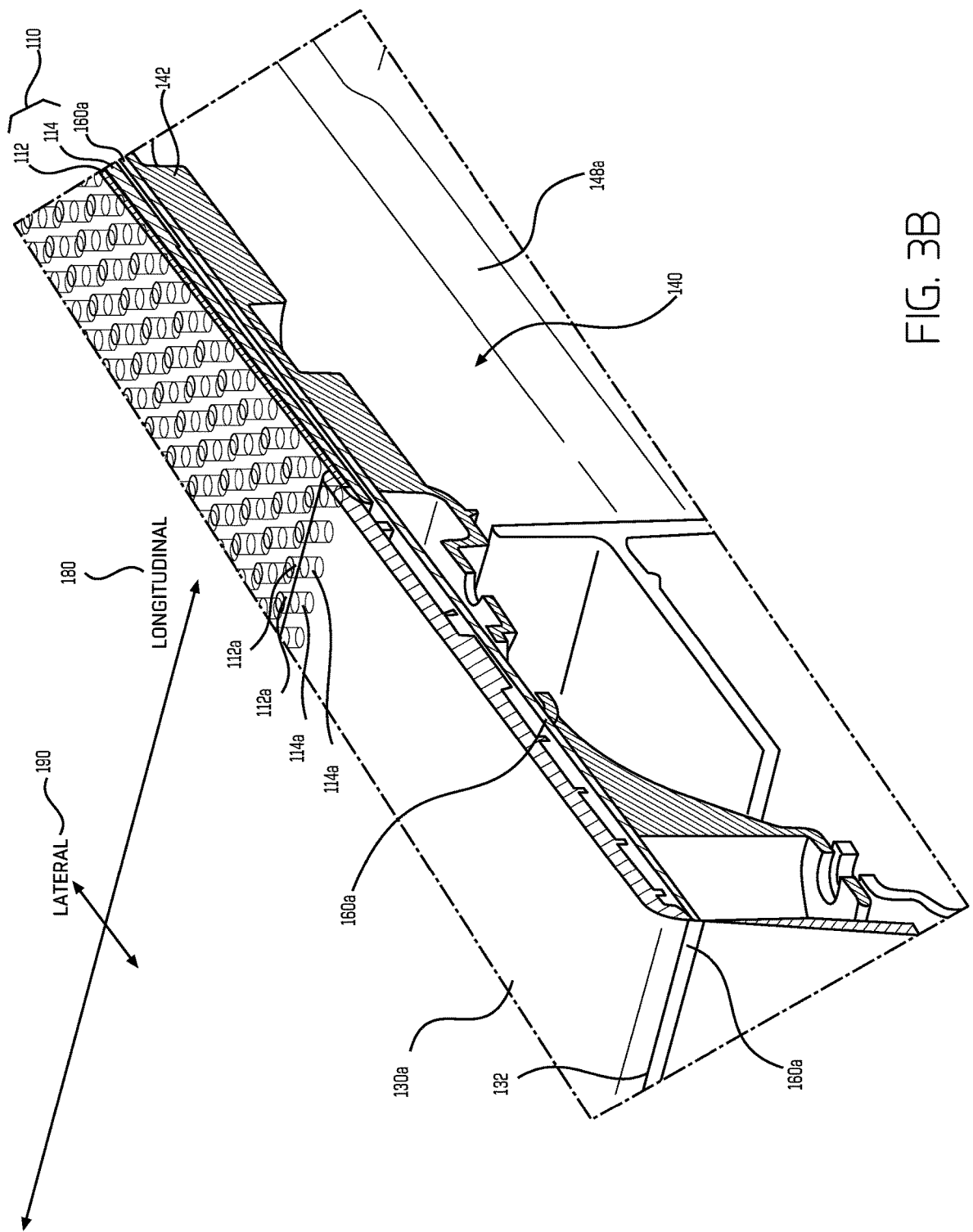
FIG. 3B is an enlarged view of a portion of FIG. 3A.
Figure 4:
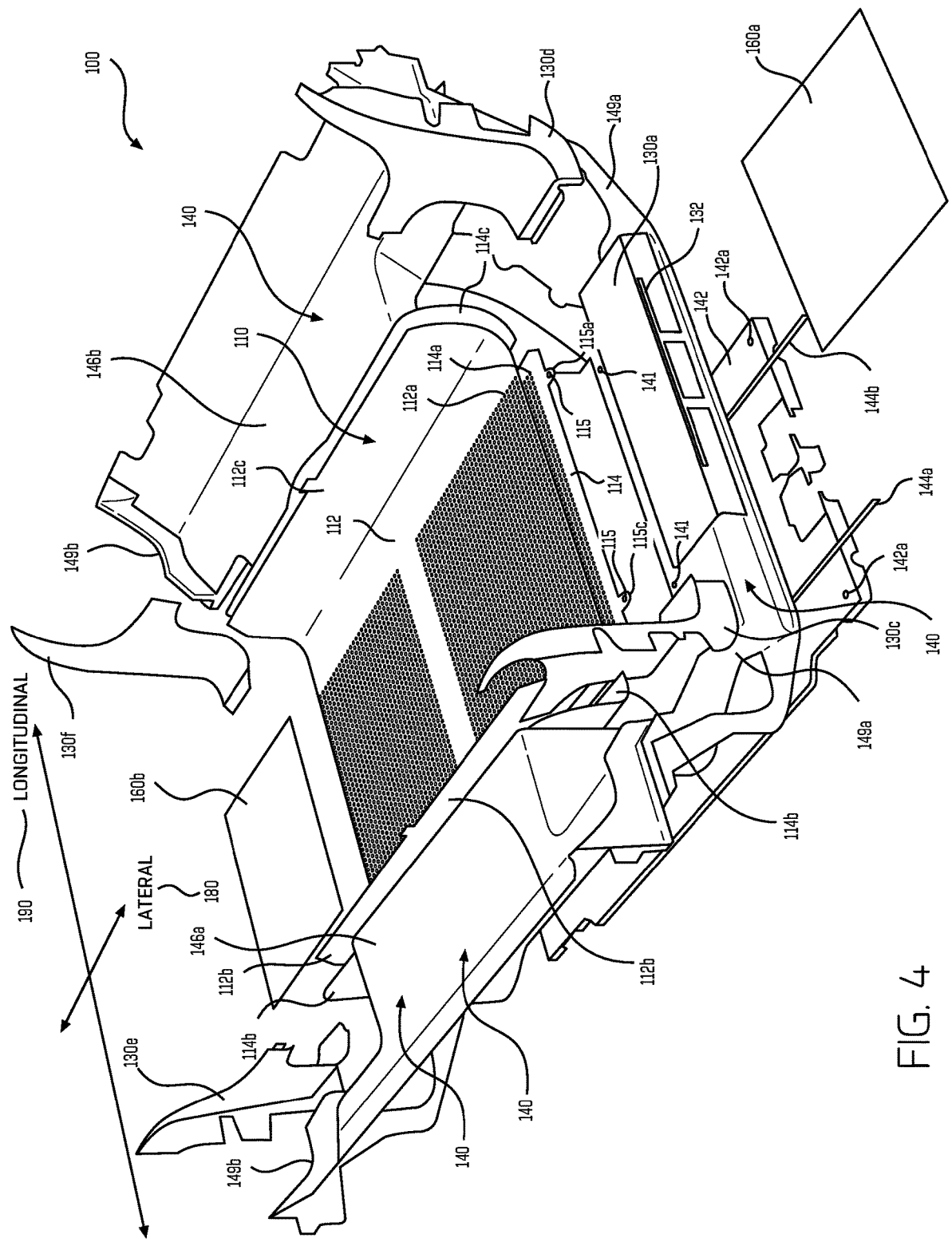
FIG. 4 is an exploded view of the example vehicle floor area of FIG. 1.

FIG. 1 is a perspective view of a vehicle floor area 100 according to an example of the present disclosure. FIGS. 2A and 3A are perspective sectional views of the vehicle floor area 100 of FIG. 1. FIGS. 2B and 2C are enlarged views of different portions of FIG. 2A, while FIG. 3B is an enlarged view of a portion of FIG. 3A. FIG. 4 is an exploded view of the vehicle floor area 100 of FIG. 1. Thus, referring primarily to the example vehicle floor area 100 illustrated in FIG. 1 (but also referring to FIGS. 2A-2C, 3A, 3B and 4, which show various portions of floor area 100 of FIG. 1), the vehicle floor area 100 comprises a floor 110 and a body 140. Body 140 comprises a first or front seat support 146a and a second or back seat support 146b, which is opposite the front seat support 146a in a longitudinal direction 180. Body 140 further comprises a first lateral side 148a (See FIG. 3A also) and a second lateral side 148b (See FIG. 3A also), which is opposite the first lateral side 148a in a lateral direction 190. First lateral side 148a comprises a side door end portion 149a (See FIG. 3A also). Second lateral side 148b likewise comprises a side door end portion 149b (See FIG. 3A also), which is opposite the side door end portion 149a of the first lateral side 148a in the lateral direction 190. First lateral side 148a and second lateral side 148b each extend generally in the lateral direction 190 towards a center of the body 140. One or more side doors (not shown) of a vehicle (not shown but discussed, for example as vehicle 802 below in reference to FIG. 8) may be attached to the side door end portion 149a of the first lateral side 148a of the body 140. Likewise, one or more additional side doors (not shown) of the vehicle (not shown) may be attached to the side door end portion 149b of second lateral side 148b of the body 140.

The body 140 of floor area 100 further comprises a floor support 142 that extends generally upwards from a bottom or base of the body 140 towards the front seat support 146a and towards the back seat support 146b and is configured and arranged so as to be attached to support the floor 110 (See FIG. 4A, for example). The floor support 142 may in various examples comprises the same material as body 140. In examples, body 140 may comprise carbon fiber. However, the body 140 may comprise any other material that is suitable to serve as a body of vehicle, such as steel or aluminum. In various examples, floor support 142 need not be separately attached to the body 140 and may instead be formed as a single continuous or integral component of the body 140 extending generally upwards from the base of the body towards the floor 110. A first collection tray 160a is supported by the floor support 142 at the first lateral side 148a of body 140. A second collection tray 160b is supported by the floor support 142 at the second lateral side 148b of body 140.

The floor 110 comprises a top layer or mat 112 and a bottom substrate layer or substrate 114. The mat 112 may include a substantially elastic material. In certain examples, the mat 112 comprises rubber. The top layer 112 in other examples may comprise any material suitable to form a top surface a vehicle floor area. The substrate 114 may comprise a substantially rigid material. In examples, the substrate 114 may comprise plastic. In other examples, the material of the substrate may be any material that will prevent substantial deformation or change in the shape of the substrate 114 and is suitable for a vehicle floor.

The mat 112 is attached to and positioned at least partially above the substrate 114. In various examples, the mat 112 is attached to substrate via a bonded connection, which in various examples is a bonding of at least a portion of the top surface area of substrate 114. In examples, mat 112 is bonded to edges of the substrate 114 and/or to spaces between perforations 112a and 114a (as discussed below) in the mat 112 and substrate 114, respectively. The bonding of the mat 112 to the substrate 114 may in various examples be any suitable bonding technique such as adhesive, heat, pressure or chemical bonding. The substrate 114 is positioned at least partially above the floor support 142 and attached thereto. In various examples, substrate 114 may be attached to floor support 142 via mechanical fasteners. For example, as illustrated, substrate 114 may comprise fastener holes 115 that are aligned with fastener holes 142a of floor support 142, which are aligned with fastener holes 141a of the side door end portion 149a of the first lateral side 148a of body 140 (See FIG. 4). A mechanical fastener such as a bolt may be inserted through each of the respective fastener holes to secure substrate 114 (and its attached mat 112) to the floor support 142 and to the side door end portion 149a of body 140. Fastener holes 115 may be located in tabs 115a. It should be appreciated that substrate 114 in various examples may be attached to the floor support 142 in any other suitable manner, such as bonding.

The mat 112 comprises a plurality of top layer or mat perforations 112a. Mat perforations 112a as illustrated are positioned at both the first lateral side 148a of body 140 and at the second lateral side 148b of body 140. Each of the mat perforations 112a are substantially cylindrical in shape having a diameter, which in various examples may range from 0.5 mm to 2.0 mm. In other examples, however, mat perforations 112a may be any suitable shape and size to enable solid waste or liquid waste of a particular size, e.g., the size of dust particles or small pebbles, to fall through the mat perforations 112a. The substrate 114 may similarly comprise a plurality of substrate perforations 114a. Substrate perforations 114a are also substantially cylindrical and have a diameter, which in various examples may also range from 0.5 mm to 2.0 mm. In some examples, the substrate perforations 114a may be less than 4.0 mm. In various examples, the substrate perforations may be in the range of 0.5 mm to 4.0 mm. In other examples, substrate perforations 114a may be any suitable size to enable solid waste or liquid waste of a particular size, e.g., the size of dust particles or small pebbles, to fall through the substrate perforations 114a. In one particular example, each of mat perforations 112a may be smaller in diameter than each corresponding substrate perforation 114a to help prevent any solid debris from being lodged in the substrate perforations 114a, where the lodged debris may be more difficult to access. The substrate perforations 114a are also positioned at both the first lateral side 148a of body 140 and at the second lateral side 148b of body 140 and are substantially aligned with the mat perforations 112a. The substantial alignment of the mat perforations 112a with the substrate perforations 114a enables liquid or solid waste to fall through both the mat perforations 112a and the substrate perforations 114a onto the first collection tray 160a and onto the second collection tray 160b. Natural vibrations of a vehicle in operation (to which the floor area 100 may be connected or part of) can cause debris lying on the top surface of mat 112, e.g., in the spaces located between each mat perforations 112a, to fall through the perforations 112a, 114a in a sieving or sifting type manner.

In various examples, the floor 110 may further comprise a first lateral panel 130a, a second lateral panel 130b, a first corner panel 130c, a second corner panel 130d, a third corner panel 130e and a fourth corner panel 130f. The first lateral panel 130a may be attached at the side door end portion 149a of the first lateral side 148a of body 140 (See FIG. 3A, FIG. 4) and may be secured to the substrate 114 in various examples. The second lateral panel 130b may be attached at the side door end portion 149a of the second lateral side 148b of the body 140 (See FIG. 3A) and may be secured to the substrate 114 in various examples.

The first and second corner panels 130c, 130d may be attached to the first lateral panel 130a at a first longitudinal end of the first lateral panel 130a and to an opposite longitudinal end of the first lateral panel 130a, respectively. The first lateral panel 130a may also be secured to the substrate 114, for example, at the curved front seat connecting portion 114b and at the curved back seat connecting portion 114c. It should be appreciated that the first and second corner panels 130c, 130d need not be separate pieces from first lateral panel 130a and may instead be formed as a single continuous piece in various examples. It should further be appreciated that in various embodiments the vehicle floor area need not include any floor panels.

The third and fourth corner panels 130e, 130f may be attached to the second lateral panel 130b at a first longitudinal end of the second lateral panel 130b and to an opposite longitudinal end of the second lateral panel 130b, respectively. The second lateral panel 130b may also be secured to the substrate 114, for example, at the curved front seat connecting portion 114b and at the curved back seat connecting portion 114c. The mat 112 may likewise have a curved front seat connecting portion 112b and curved back seat connecting portion 112c that conforms to the shape of the curved front and back seat connecting portions 114b, 114c of the substrate 114, respectively, and may likewise be secured to substrate 114 and first and second lateral panels 130a, 130b, respectively 130b. It should be appreciated that the third and fourth corner panels 130e, 130f, like panels 130c, 130d need not be separate pieces from second lateral panel 130b and may instead be formed as a single continuous piece in various examples. It should be appreciated that the curved seat connecting portions 112b, 112c of the mat may be formed integrally or as a single piece with the mat 112 and curved seat connecting portions 114b, 114c may likewise be formed integrally or a single piece with substrate 114.

The first lateral panel 130a comprises a slot 132 that extends longitudinally. The first collection tray 160a may be inserted into, and accessible for removal from, the floor support 142. That is, the first collection tray 160*a* may be removed manually from the slot 132 (and hence the entire floor area 100) so that any liquid or solid waste that has fallen onto the first collection tray 160*a* can be removed from the first collection tray 160*a*. Once the first collection tray 160*a* is removed, it may then be re-inserted or slid into the slot 132 int the first lateral panel 13*a* to be supported by the floor support 142 for collection of further solid or liquid waste that falls through the mat perforations 112*a* and substrate perforations 114*a*.

It should be appreciated that the second lateral panel 130*b* likewise may comprise a slot (not shown) that extends longitudinally, similar to slot 132. And the second collection tray 160*b*, like the first collection tray 160*a* may be inserted into, and accessible for removal from, the floor support 142. That is, the second collection tray 160*b* may be removed manually from the slot in the second lateral panel 130*b* (and hence the entire floor area 100) so that any liquid or solid waste that has fallen onto the second collection tray 160*b* can be removed from the second collection tray 160*b*. The second collection tray 160*b*, once removed, may then be re-inserted or slid into the slot in the second lateral panel 130*b* to be supported by the floor support 142 for collection of any further solid or liquid waste that falls through the mat perforations 112*a* and floor perforations 114*a*.

In various examples, one or more door (not shown) may be hingably coupled or otherwise suitably attached to the first lateral panel 130*a* to allow access to, and closure of, the slot 132 in the first lateral panel 130*a*. Similarly, one or more door (not shown) may be hingably coupled or otherwise suitably attached to the second lateral panel 130*b* to allow access to, and closure of, the slot (not illustrated) in the second lateral panel 130*b*. It should be appreciated that in certain examples, the doors may be opened to allow removal and insertion of the tray(s) and may be closed to at least partially conceal or hide such tray(s) from view. It should also be appreciated that in some examples, the doors may be coupled to otherwise suitably attached to any portion of the vehicle body and, in various examples, be arranged so as to at least partially or fully cover, hide or conceal the slot(s) or openings into which the tray(s) are inserted.

Referring now more specifically to FIGS. 2A-2C, FIG. 2A is a perspective sectional view of the floor area 100 of FIG. 1, while FIGS. 2B and 2C are enlarged views of portions of FIG. 2A. FIG. 2B shows the floor support 142 comprising a first support guide 144*a* (See FIG. 4 also) in the form of a laterally extending rail and the first collection tray 160*a* including a first support structure 162*a* insertable into and supportable by the first support guide 144*a*. FIG. 2C illustrates the floor support 142 comprising a second support guide 144*b* (See FIG. 4 also) in the form of a laterally extending rail that is longitudinally opposite the first support guide 144*a* and illustrates the first collection tray 160*a* including a second support structure 162*b* longitudinally opposite the first support structure 162*a* and likewise insertable into and supportable by the second support guide 144*b*. It should be appreciated that the first support guide 144*a* is positioned at the first lateral side 148*a* of body 140, while the second support guide 144*b* is also positioned at the first lateral side 148*a* of body 140. It should additionally be appreciated that the floor support 142 may further comprise third and fourth support guides (not shown) in the form of laterally extending rails similar to the first and second support guides 144*a*, 144*b*, but positioned at the second lateral side 148*b* of body 140. Similarly, it should be appreciated that the second collection tray 160*b* may likewise comprise a third support structure (not shown) longitudinally opposite a fourth support structure (not shown) and insertable into and supportable by the corresponding third and fourth support guides. The support structures 162*a*, 162*b* in the example illustrated in FIGS. 2B and 2C are in the form of a T shape and slide along corresponding L shaped or cantilever shaped support guides 144*a*, 144*b*. It should be appreciated, however, that each of the support structures and corresponding support guides herein may be in of any form, arrangement or shape suitable to allow the collection trays 160*a*, 160*b* and any support structures therefore to be insertable into, supportable by, and removable from the support guides. In examples, the support structures may be in the form of wheels that are insertable into, and moveable within, the support guides.

Figure 5:
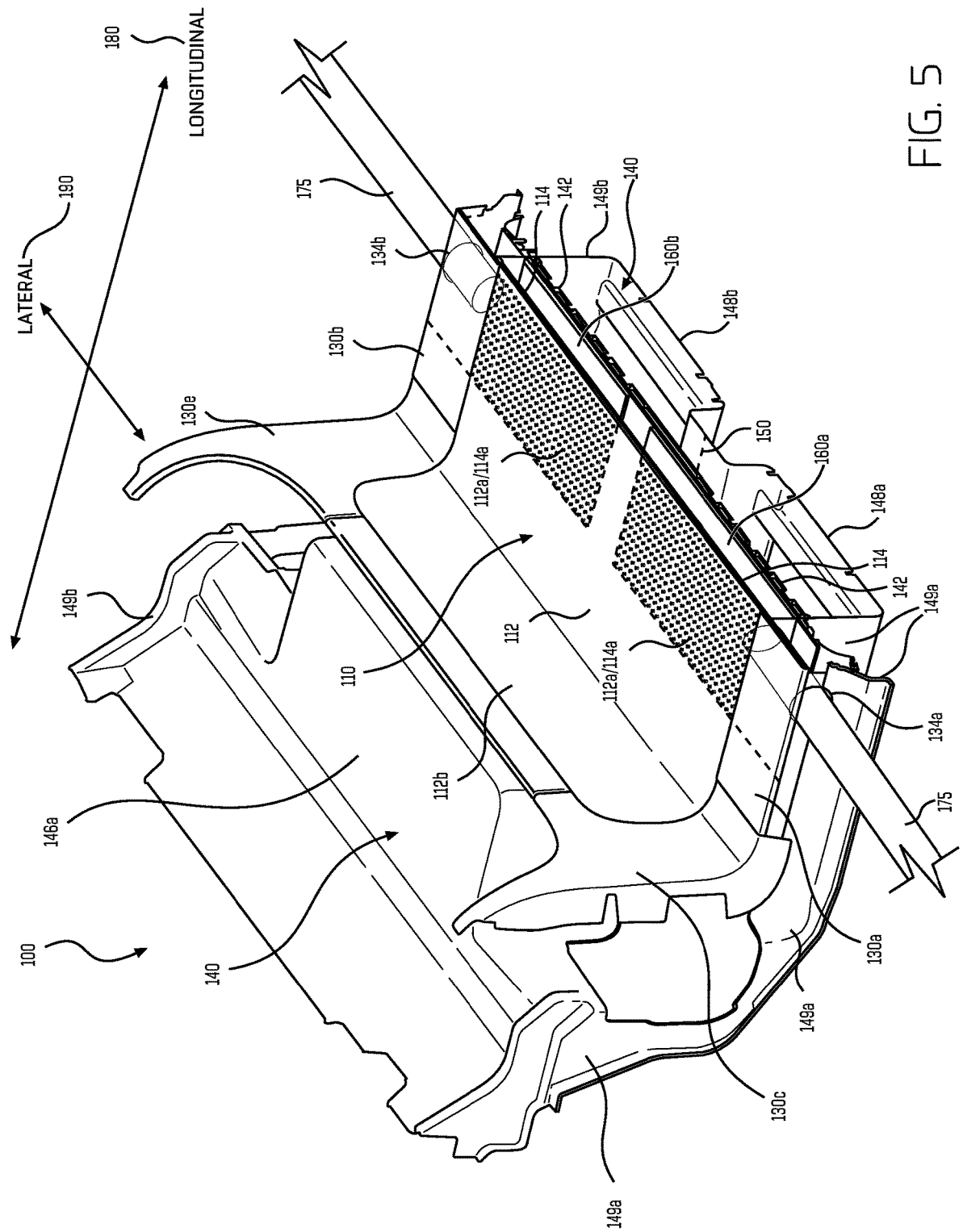
FIG. 5 is a perspective sectional view of another example vehicle floor area of the present disclosure.

Turning now to FIG. 5, FIG. 5 illustrates another example of a vehicle floor area 100 of the present disclosure. The vehicle floor area 100 of FIG. 5 is similar to the vehicle floor area 100 illustrated in FIGS. 1, 2A-2C, 3A, 3B and 4 except as described below and is apparent from the figures. Like elements are identified with the same or similar reference numerals. The description of those elements including each of the alternatives discussed above in connection with FIGS. 1, 2A-2C 3A, 3B and 4 apply in many respects to like element numbers in FIG. 5. The vehicle floor area 100 of FIG. 5 differs primarily from the vehicle floor area 100 illustrated in FIGS. 1, 2A-2C, 3A, 3B and 4 in that instead of having first and second collection trays 160*a*, 160*b* removable from respective slots of first and second lateral panels 130*a*, 130*b*, each of the first and second lateral panels 130*a*, 130*b* instead comprise gas openings or ports 134*a*, 134*b* for connecting a gas source 175 to the openings 134*a*, 134*b*. The gas source 175 (or multiple gas sources) in various examples may be connected to each of the respective openings 134*a*, 134*b* for applying a negative pressure or suction to remove fluid waste or liquid waste that may have accumulated on the trays 160*a*, 160*b*. The negative pressure or suction supplied by the gas source 175 may also cause any solid waste stuck in the perforations 112*a* or 114*a* to be dislodged. In various examples, the gas source 175 may additionally or alternatively apply a positive pressure to cause any solid waste that may be stuck in one of the perforations 112*a* or 114*a* to be dislodged from the perforations 112*a* or 114*a*. The gas source 175 may be manually connected to the openings 134*a*, 134*b*, or in various examples may be automated. In examples, the gas source 175 may be a negative and/or positive pressure pump. It should thus be appreciated that in the vehicle floor area 100 illustrated in FIG. 5, the collection trays 160*a*, 160*b* need not be removed from the vehicle floor area to remove any dust collected that has fallen on the trays 160*a*, 160*b*. It should also be appreciated that in various embodiments each of the side door end portions 149*a*, 149*b* and/or the lateral sides 148*a*, 149*b* may comprise gas openings for connection to a gas source or to allow the positive or negative pressure from the gas source to flow.

Figure 6:
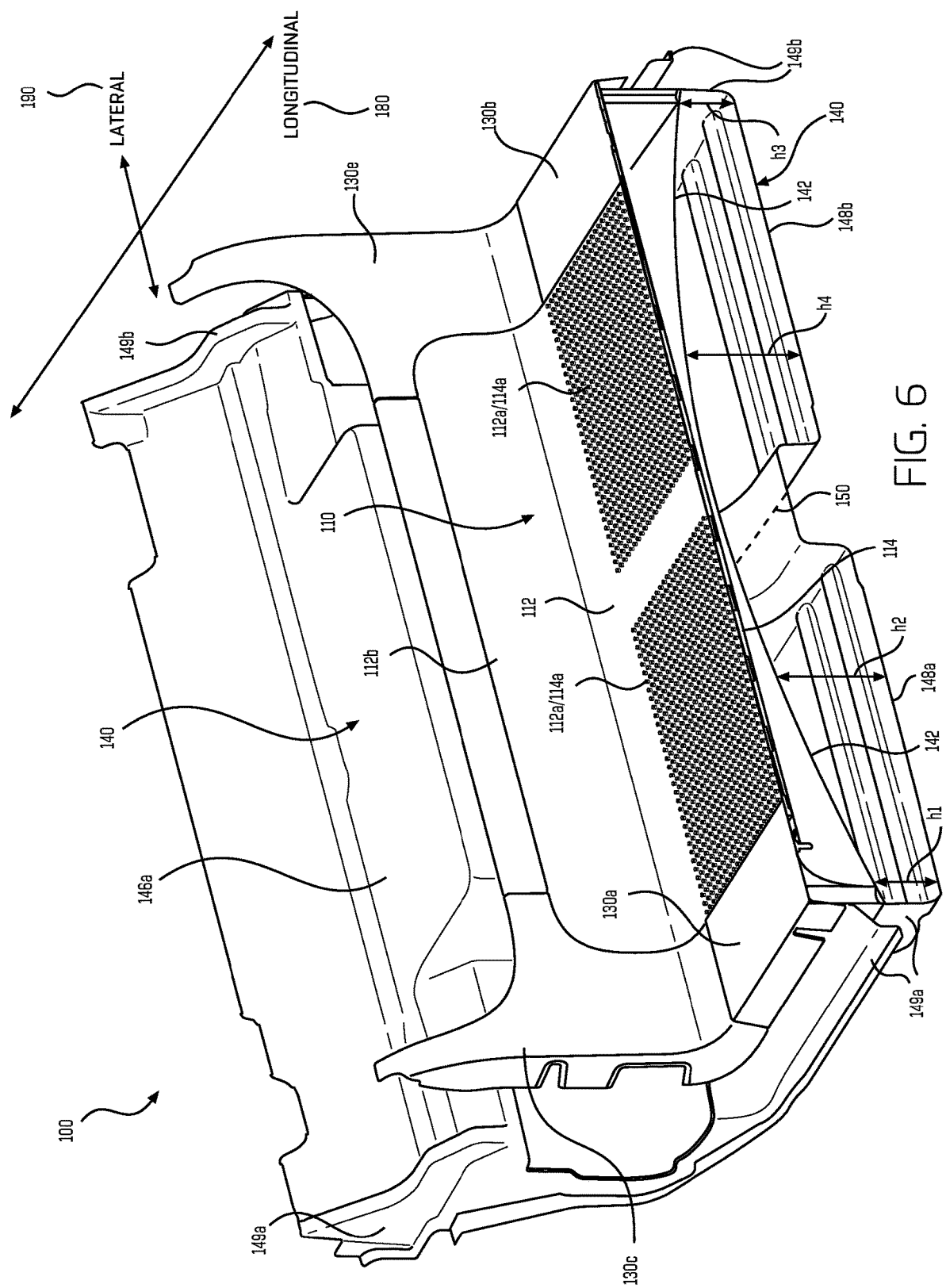
FIG. 6 is a perspective sectional view of still another example vehicle floor area of the present disclosure.

FIG. 6 illustrates another example of a vehicle floor area 100 of the present disclosure. The vehicle floor area 100 of FIG. 6 is similar to the vehicle floor area 100 of FIGS. 1, 2A-2C, 3A, 3B and 4 except as described below and is apparent from the figures. Like elements are identified with the same or similar reference numerals. The description of those elements including each of the alternatives discussed above in connection with FIGS. 1, 2A-2C, 3A, 3B and 4 apply in many respects to like element numbers in FIG. 6. The vehicle floor area 100 of FIG. 6 differs primarily from the vehicle floor area 100 of FIGS. 1, 2A-2C, 3A, 3B and 4 in that instead of solid or liquid waste falling through the perforations 112a, 114a onto the collection trays 160a, 160b, the waste instead falls directly onto the floor support 142. That is, the floor support 142 of FIG. 6 does not support the collection trays 160a or 160b at all. The floor support 142 is instead structured and arranged so that any waste that falls through perforations 112a and 114a falls directly onto floor support 142 so that the waster may slide or fall downwardly on the top surface of floor support 142 towards respective side door end portions 149a, 149b via gravity. It should therefore be appreciated that the floor support 142 in various examples may be considered as one or more collection receptacle (as may the collection tray(s) or collection bin(s), as further described below). It should also be appreciated that, in various examples, the top surface of floor support 142 may be substantially smooth to allow the debris that falls directly onto the top surface of the floor support 142 to slide more easily towards side door end portions 149a, 149b.

The floor support 142 illustrated in FIG. 6 comprises a height h1 near side door end portion 149a that is smaller than a height h2 near a center 150 of body 140. Likewise, the floor support 142 comprises a height h3 at or near the opposite side door end portion 149b that is smaller than a height h4 at or near the center 150 of body 140. Thus, it should be appreciated that the body 140 has a floor support 142 that may be arcuate or curved in such a way that a height of the floor support 142 (and hence the height of the body 140 itself) increases from (i) the side door end portion 149a (of the first lateral side 148a of body 140) to the center 150 of the body 140 and (ii) the side door end portion 149b (of the second lateral side 148b of body 140) to the center 150 of the body 140. It should further be appreciated that while the vehicle floor area 100 of FIG. 6 illustrates the floor support 142 being curved, the floor support 142 in other examples may instead be angled in a triangular like shape such that the height of the floor support 142 similarly increases from (i) the side door end portion 149a (of the first lateral side 148a of body 140) to the center 150 of the body 140 and (ii) the side door end portion 149b (of the second lateral side 148b of body 140) to the center 150 of the body 140. It should additionally be appreciated that, in the example illustrated in FIG. 6, the side door end portion 149a of the first lateral side 148a of the body 140 and/or the first lateral panel 130a may be at least partially removable and/or have a door, an opening or any other suitable structure that enables the waste debris that has fallen downwardly towards the side door end portion 149a to fall outside the vehicle or vehicle floor area 100. Similarly, the side door end portion 149b of the second lateral side 148b of the body 140 and/or the second lateral panel 130b may be at least partially removable and/or have a door, an opening or any suitable structure that enables the waste debris that has fallen downwardly towards the side door end portion 149b to fall outside the vehicle or vehicle floor area 100. In some examples, such door, opening or other structure may be located in the floor support 142 itself and/or a portion of the body 140 beneath the floor support 142 so that any debris that may fall through perforations 112a, 114a can fall directly out of a bottom portion of the vehicle. In various examples, the floor support 142 and/or the portion of body 140 below floor support 142 may define one or more opening, channel or other suitable structure to allow the debris to fall out of the bottom of the vehicle. In certain examples, a door may be provided for the one or more of such opening or channel in the floor support and/or the portion of body 140 to allow accesses to the opening(s) or channel(s) and to cover and at least partially conceal or hide such opening(s) or channel(s). Such door(s) may be opened and closed automatically or manually in various examples.

It should be appreciated that in certain examples, at least a portion of the floor support 142 and/or the body 140 below the floor support 142 may be constructed with a contour or shape that generally follows or conforms to the shape of (or otherwise has a shape that avoids contact with) any electronics, computing devices and/or batteries located in the vehicle floor area 100, e.g., located in the body 140 beneath floor support 142. In some examples, the one or more openings, channels or other suitable structures (defined by the body 140 and or the floor support 142) that allow waste debris to fall directly out of the bottom of the vehicle may have such shapes and be positioned between any such electronics, computing devices and/or batteries. It should further be appreciated that in any of the vehicle floor areas described herein, various sound abatement structures or materials may be included with the vehicle floor areas to aid in reducing any noise caused by the structure of the vehicle floor area, e.g., noise caused by any openings or channels in the bottom of the vehicle floor area. In some examples, a foam material (or any other suitable noise abatement material) may be added to one or ore more of the mat 112, the substrate 114, the floor support 142, the body 140 and the panels 130a, 130b to help mitigate noise that may occur inside the vehicle. In some examples, the opening of any doors to allow waste debris to be removed from the vehicle door area may be triggered upon stopping the vehicle, or upon opening of any of the side doors attached to the body 140, i.e., the side doors that allow passengers to enter or exit the vehicle (not shown).

Figure 7:
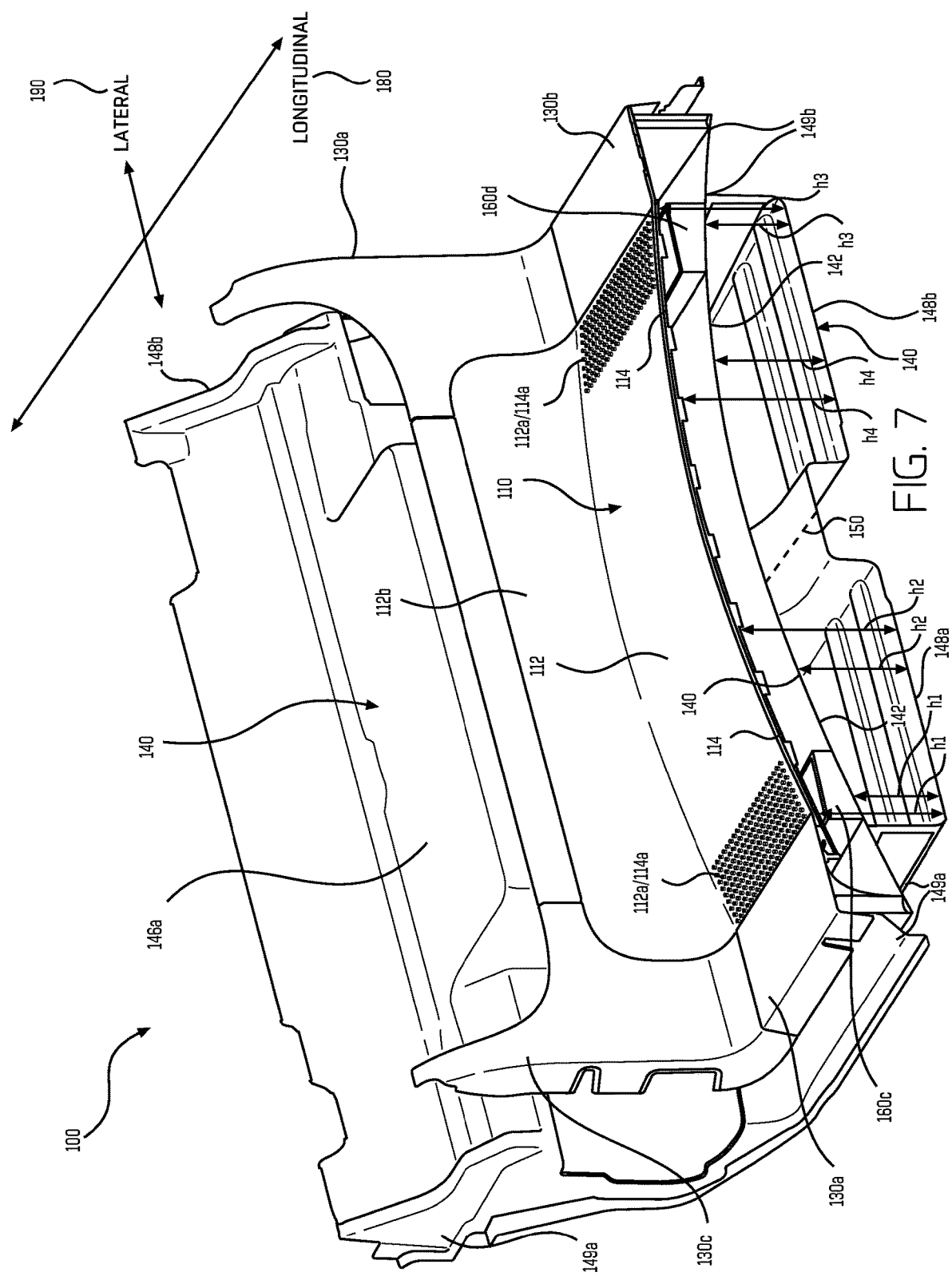
FIG. 7 is a perspective sectional view of yet another example vehicle floor area of the present disclosure.

FIG. 7 illustrates another example of a vehicle floor area 100 of the present disclosure. The vehicle floor area 100 of FIG. 7 is similar to the vehicle floor area 100 of FIGS. 1, 2A-2C, 3A, 3B, 4 and FIG. 6 except as described below and is apparent from the figures. Like elements are identified with the same or similar reference numerals. The description of those elements including each of the alternatives discussed above in connection with FIGS. 1, 2A-2C, 3A, 3B, 4 and 6 apply in many respects to like element numbers in FIG. 7. The vehicle floor area 100 of FIG. 7 differs primarily from the vehicle floor area 100 of FIG. 6 in that instead of only the floor support 142 being curved or otherwise angled downwardly from a center 150 of the body 140 towards each side door end portions 149a, 149b, both the floor support 142 and the floor 110 are angled or otherwise curved downwardly from a center 150 of the body 140 towards side door end portions 149a, 149b. This enables any waste that may collect on a top surface of the mat 112 to slide or fall downwardly on the mat 112 away from a center of the body 140 towards side door end portions 149a, 149b where the waste may fall through the mat and substrate perforations 112a, 114a onto first and second collection bins 160c, 160d, respectively. It should thus be appreciated that the vehicle floor area 100 of FIG. 7 differs in two other respects from the vehicle floor area 100 of FIG. 6. First, the vehicle floor area 100 of FIG. 7 comprises the first and second collection bins 160c, 160d supported by and positioned against or at respective side door end portions 149a, 149b of the lateral sides 148a, 148b. Second, the mat perforations 112a and substrate perforations 114a of FIG. 7 are aligned with the position of the first and second collection bins 160c, 160d and thus do not extend laterally towards the center of body 140 as much as the perforations 112a, 114a in the vehicle floor area 100 of FIG. 6. Perforations 112a, 114a in FIG. 7 are instead positioned only near the side door end portions 149a, 149b.

It should also be appreciated that, like the vehicle floor area 100 of FIG. 6, the floor support 142 and the floor 110 in FIG. 7 each comprise a height h1 near side door end portion 149a that is smaller than a height h2 near the center 150 of body 140. Likewise, the floor support 142 and the floor 110 each comprise a height h3 near side door end portion 149b that is smaller than a height h4 near the center 150 of body 140. Thus, each of the floor support 142 and the floor 110 is arcuate, curved or angled in such a way that a height of each of the floor support 142 (and hence the height of the body 140 also) and the floor 110 increases from (i) the side door end portion 149a (of the first lateral side 148a of body 140) to the center 150 of the body 140 and (ii) the side door end portion 149b (of the second lateral side 148b of body 140) to the center 150 of the body 140.

Similar to the vehicle floor area 100 of FIG. 6, it should additionally be appreciated that at least a portion of the side door end portion 149a of the first lateral side 148a of the body 140 and/or the first lateral panel 130a of the vehicle floor area 100 of FIG. 7 may be removable and/or have a door, an opening or other suitable structure that enables the first collection bin 160c to be removed from the vehicle floor area 100 to dump any waste collected in the bin 160c. Similarly, the side door end portion 149b of the second lateral side 148b of the body 140 and/or the second lateral panel 130b in the vehicle floor area 100 of FIG. 7 may be at least partially removable and/or have a door, an opening or other suitable structure that enables the second collection bin 160d to be removed from the entire vehicle floor area 100 to dump the waste collected in the second collection bin 160d. In some examples, the one or more door that enables the bin(s) to be removed may be opened and closed automatically or manually. It should be appreciated that in various examples, the one or more door may also at least partially conceal or hide the bin(s) from view when closed. Alternatively or additionally, any of the removable panel(s) may also at least partially conceal or hide the bin(s) from view.

Figure 9:
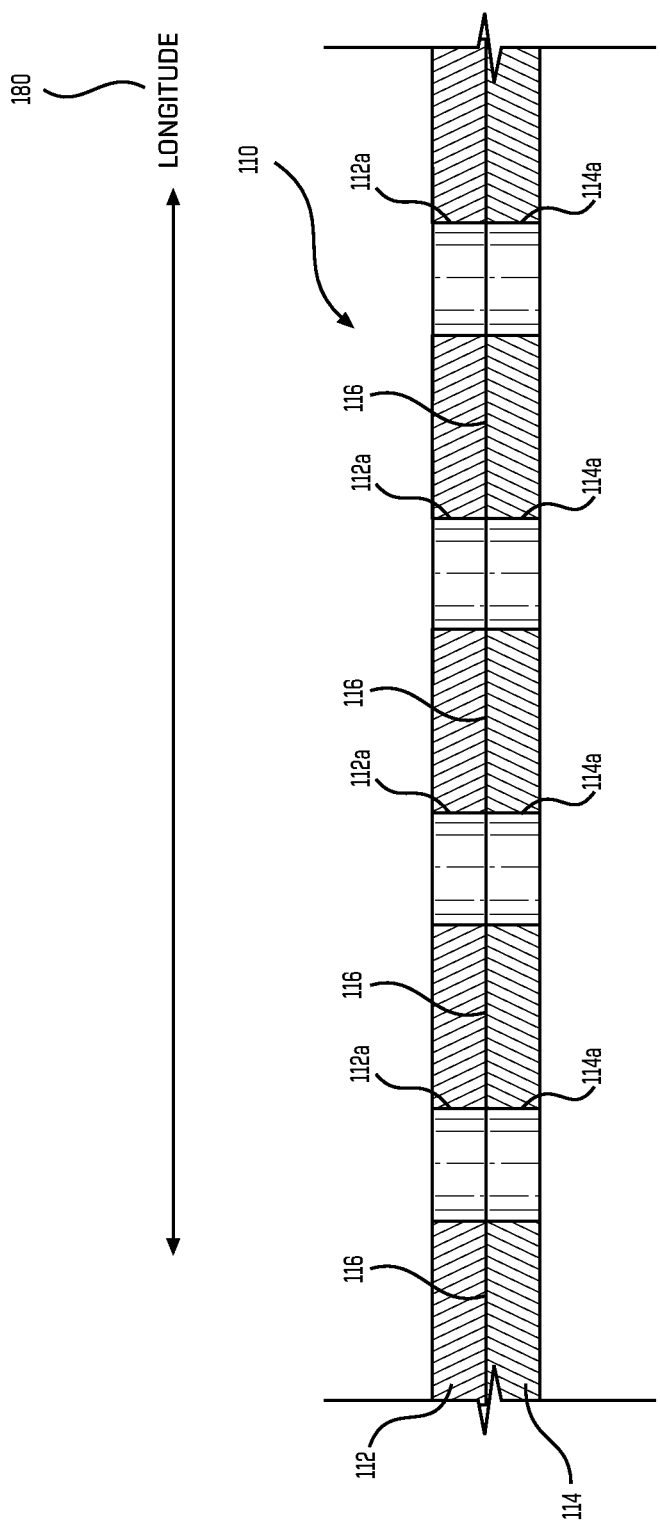
FIG. 9 is a sectional view of the example vehicle floor area of FIG. 1.

FIG. 9 illustrates an enlarged sectional view of a portion of the example vehicle floor area 100 of FIG. 1. The enlarged sectional view of FIG. 9 shows the top layer or mat 112 and the bottom substrate 114 of floor 110. As shown, the top layer 112 includes the mat or top layer perforations 112a and the bottom substrate 114 includes the substrate or bottom layer perforations 114a. The mat perforations 112a are substantially aligned with the substrate perforations 114a. Between each mat perforation 112a and the respectively aligned substrate perforation 114a in the longitudinal direction 180 is a space 116 where a bottom surface of the mat 112 may be attached to a top surface of the substrate 114, e.g., via bonding. It should be appreciated that in various examples, the mat 112 need not be attached or bonded to the substrate 114 at every space 116 between each mat perforation 112a and substrate perforation 114a. The mat 112 in some examples may instead be attached at one or more of the spaces 116, but not all of the spaces 16. It should likewise be appreciated that in some examples, the mat 112 may not be attached to the substrate 114 at any of the spaces 116, and may instead be attached around edge or edge portions of the mat 112 and the substrate 114. It should also be understood that mat perforations 112a and substrate perforations 114a need not be precisely aligned and may be offset slightly in various examples. In should further be appreciated that in various examples, instead of the mat perforations 112a and substrate perforations 114a having substantially the same size or diameter as illustrated in FIG. 9, the mat perforations 112a may be smaller than each of the substrate perforations 114a to help prevent larger waste particles from getting lodged in the substrate perforation 114a, which may be more difficult to access and thus more difficult to dislodge than waste particles lodged in the mat perforations 112a.

It should also be appreciated that in various examples, a portion of the mat 112 (or the entire mat 112) may have multiple mat perforations 112a that are substantially aligned with a single substrate perforation 114a. A portion of the mat 112 (or the entire mat) may in other examples have multiple map perforations 112a aligned with more than one, but less than the multiple map perforations 112a. Similarly, in some example, the mat 112 may be formed to have single individual mat perforations 112a aligned with a plurality of substrate perforations. Additionally, although the perforations 112a and 114a in FIG. 9 are illustrated as being uniformly spaced and distributed across the mat 112 and the substrate 114, but in various examples, the mat perforations 112a and the substrate perforations 114a may be non-uniformly spaced or distributed. For example, each mat perforations 112a may be randomly spaced apart from each of the other mat perforations 112a and each of the substrate perforations 114a may be substantially aligned with the randomly spaced mat perforations 112a. It should be appreciated that the entire description with respect to FIG. 9 herein may apply to a variety of the vehicle floor areas 100 of the present disclosure.

In various examples, the mat 112 of any one of the vehicle floor areas 100 of the present disclosure may further comprise a plurality of speckles (not shown) located in a top surface of the mat 112 and visible on the top surface of the mat. The speckles may be interspersed uniformly between each of the mat perforations 112a or randomly spaced between each of the mat perforations 112a. The speckles may aid in masking the visibility of any solid waste, e.g., dust, that does not fall through the mat perforations 112a and instead collects on the top surface of the mat 112 between the mat perforations 112a. In examples, the speckles may be a white or whitish color, and the mat 112 may be a black or blackish color, e.g., a black rubber mat material.

It should also be appreciated that, while various examples of the vehicle floor areas 100 of the present disclosure are described as having first and second collection trays, in various other examples, the vehicle floor areas may comprise a single collection tray. The single collection tray my be located only at only one lateral side of the body of the vehicle floor area or may extend from one lateral side of the body to the other lateral side of the body (or from a side door end portion of one lateral side to the side door end portion of the other lateral side). Likewise, while various examples herein describe a vehicle floor area having first and second collection bins, it should be appreciated that in various other examples, the vehicle floor area may comprise only a single collection bin. The single collection bin may be located at only one lateral side of the body (or at the side door end portion of one lateral side of the body), or the single collection bin may extend from one lateral side of the body from one lateral side of the body to the other lateral side of the body (or from a side door end portion of one lateral side to the side door end portion of the other lateral side). Various examples of the present disclosure illustrate the collection bins, trays and perforations not extending all the way to a middle or center of the vehicle floor areas or being located only at or near side door end portions of respective lateral sides of the body. However, in various other examples, the bins, trays and perforations may extend across an entire lateral area of the vehicle floor area past a center of the vehicle floor areas.

It should also be appreciated that any of the collection trays or collection bins described herein (whether the collection trays are a plurality of trays or only a single collection tray, or a plurality of bins or only a single collection bin) may be formed in any shape or structure that allows waste to fall on top of, or be collected on, or within, the collection tray(s) or bin(s). Each of the collection tray(s) or bin(s) herein may thus be considered as collection receptacle(s). For example, while the collection tray(s) illustrated herein are substantially flat, in various examples, the collection tray(s) or receptacle(s) may include a raised rim around at least a portion of the perimeter of the tray(s) or receptacles(s). The raised rim may create a deep or shallow collection area within the perimeter of the tray(s) or receptacle(s), depending on the height of the rim. Similarly, while at least a portion of the collection bin(s) illustrated herein form an open rectangular prism like structure, each of the collection bin(s) or receptacle(s) described herein may have any suitable shape (e.g., an open cylindrical shape or cylindrical like shape, substantially flat or entirely flat) that allows waste to fall on top of, or be collected on, or within, the bin(s) or receptacle(s). In examples, the bin(s) or receptacle(s) herein may comprise at least one side wall forming deep or shallow interior area that collects, catches, or holds waste. It should further be appreciated that in various examples of the vehicle floor areas described herein, the collection receptacle(s) may comprise the floor support itself (as discussed above) and may allow the debris to automatically fall out a side of the vehicle floor area or through a bottom of the vehicle (as also discussed above), or may comprise any structure located at least substantially below the floor perforations that allows the waste debris to fall on top of, or be collected on, or within, the receptacle(s), bin(s) or tray(s).

It should further be appreciated that the use of the term body herein is not limited to a vehicle having a unibody construction. In some examples, the term body may comprise a vehicle having a body-on-frame construction. In least some examples, the term body may therefore comprise the vehicle body, the vehicle frame, or both the vehicle body and the vehicle frame. It should be appreciated that the term body may comprise any structure and arrangement suitable for including the features for the vehicle floor areas described herein.

Figure 8:
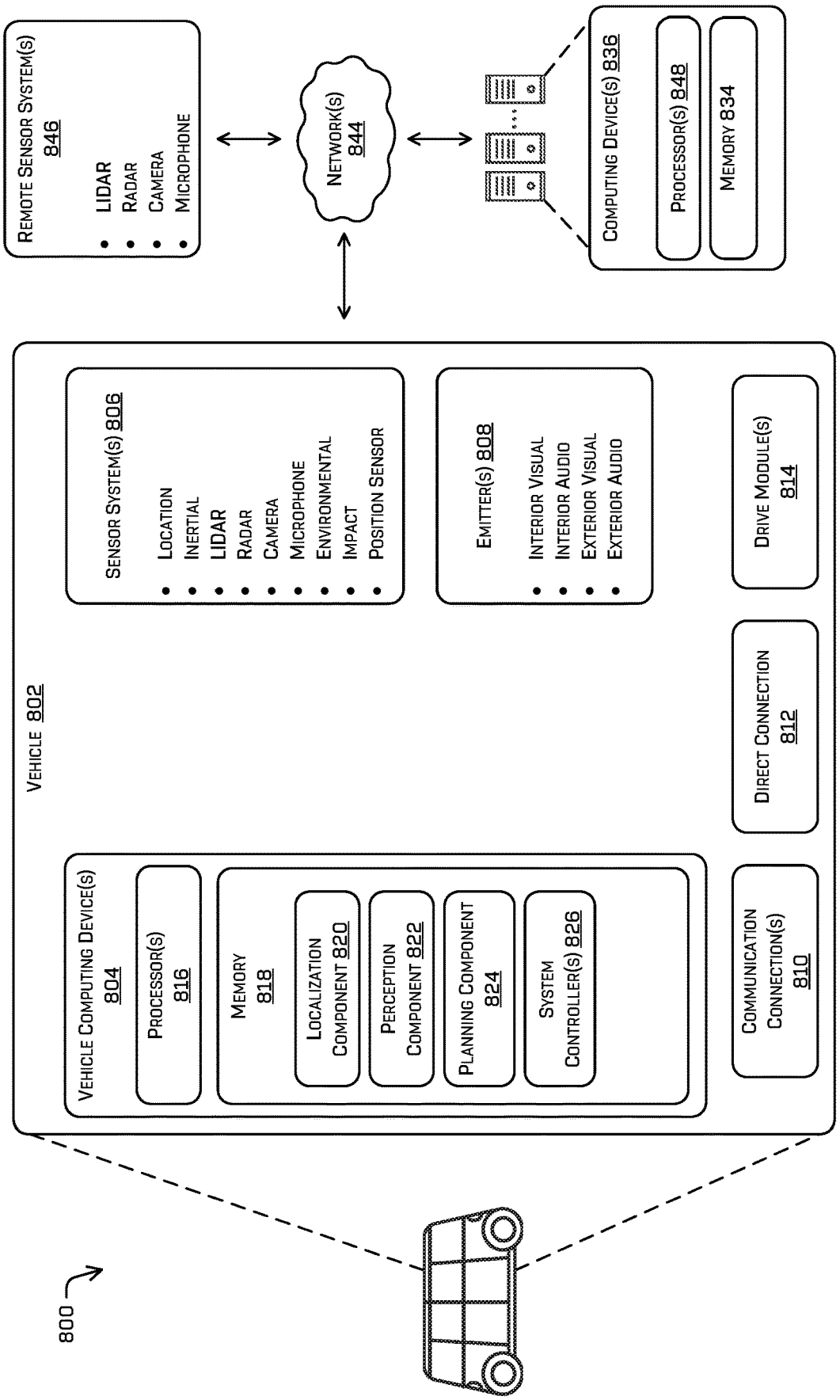
FIG. 8 is a block diagram illustrating an example system for controlling a vehicle having vehicle floor areas according to various examples of the present disclosure.

FIG. 8 is a block diagram of an example system 800 for implementing techniques or functions of any vehicle 802 utilizing the various example vehicle floor areas 100 of the present disclosure. The system 800 may include a vehicle 802, which may include a vehicle computing device 804, one or more sensor systems 806, one or more emitters 808, one or more communication connections 810, at least one direct connection 812, and one or more drive modules 814.

Vehicle computing device 804 may include one or more processors 816 and memory 818 communicatively coupled with the one or more processors 816. Vehicle 802 may include any type of vehicle including an autonomous vehicle or a semi-autonomous vehicle. In the illustrated example, the memory 818 of vehicle computing device 804 stores a localization component 820, a perception component 822, a planning component 824, and one or more system controllers 826. Though depicted in FIG. 8 as residing in the memory 818, it is contemplated that the localization component 820, the perception component 822, the planning component 824, and the system controllers 826 may additionally, or alternatively, be accessible to the vehicle 802 (e.g., stored on, or otherwise accessible by, memory remote from the vehicle 802, such as, for example, on memory 834 of a remote computing device 836).

In at least examples, the localization component 820 may include functionality to receive data from the sensor system(s) 806 to determine a position and/or orientation of the vehicle 802 (e.g., one or more of an x-, y-, z-position, roll, pitch, or yaw). For example, the localization component 820 may include and/or request/receive a map of an environment and can continuously determine a location and/or orientation of the autonomous vehicle within the map.

In some examples, the perception component 822 may include functionality to perform object detection, segmentation, and/or classification. In general, the planning component 824 may determine a path for the vehicle 802 to follow to traverse through an environment.

In at least some examples, the vehicle computing device 804 may include one or more system controllers 826, which may be configured to control steering, propulsion, braking, safety, emitters, communication, and other systems of the vehicle 802. The system controller(s) 826 may communicate with and/or control corresponding systems of the drive module(s) 814 and/or other components of the vehicle 802.

As can be understood, the components discussed herein (e.g., the localization component 820, the perception component 822, the planning component 824, the one or more system controllers 826 are described as divided for illustrative purposes. However, the operations performed by the various components can be combined or performed in any other component.

In some instances, aspects of some or all of the components discussed herein can include any models, algorithms, and/or machine learning algorithms. For example, in some instances, the components in the memory 818 (and the memory 834, discussed below) can be implemented as a neural network. As can be understood in the context of this disclosure, a neural network can utilize machine learning, which can refer to a broad class of such algorithms in which an output is generated based on learned parameters. Although discussed in the context of neural networks, any type of machine learning can be used consistent with this disclosure.

In at least examples, the sensor system(s) 806 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. In various examples, the sensor system(s) 806 may include a position sensor configured to determine whether a passenger is seated in a seat assembly. In some examples, the position sensor may include a weight switch configured to determine whether a weight is located on the seat assembly. The weight may include a minimum weight associated with a passenger (e.g., 50 pounds, 25 kilograms, 100 pounds, etc.). In various examples, the position sensor may include an image capture device and/or other perception sensor. In such examples, the image capture device and/or other perception sensor may send sensor data to the vehicle computing device to analyze and determine whether the object in the seat assembly is a passenger (e.g., whether it is a human or other live animal). In some examples, the sensor system(s) 806 may include a float sensor, a laser beam, and/or a weight sensor configured to sense data regarding the vehicle floor areas descried herein. Such data may be used in various examples for determining whether solid waste and/or liquid waste may have accumulated on any of the collection receptacle(s) described herein so that such waste can be removed from the vehicle floor area.

The sensor system(s) 806 can include multiple instances of each of these or other types of sensors. For instance, the LIDAR sensors can include individual LIDAR sensors located at the corners, front, back, sides, and/or top of the vehicle 802. As another example, the camera sensors can include multiple cameras disposed at various locations about the exterior and/or interior of the vehicle 802. The sensor system(s) 806 can provide input to the vehicle computing device 804. Additionally or alternatively, the sensor system(s) 806 may send sensor data, via the one or more networks 844, to the one or more computing device(s) 836 at a particular frequency, after a lapse of a predetermined period of time, in near real-time, etc.

The vehicle 802 may also include one or more emitters 808 for emitting light and/or sound. The emitters 808 in this example include interior audio and visual emitters to communicate with passengers of the vehicle 802.

The vehicle 802 may also include one or more communication connection(s) 810 that enable communication between the vehicle 802 and one or more other local or remote computing device(s). For instance, the communication connection(s) 810 can facilitate communication with other local computing device(s) on the vehicle 802 and/or the drive module(s) 814. Also, the communication connection(s) 810 can allow the vehicle to communicate with other nearby computing device(s) (e.g., computing device(s) 836, other nearby vehicles, etc.) and/or one or more remote sensor system(s) 846 for receiving sensor data.

The communications connection(s) 810 may include physical and/or logical interfaces for connecting the vehicle computing device 804 to another computing device or a network, such as network(s) 844. For example, the communications connection(s) 810 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In various examples, the vehicle 802 may include one or more drive modules 814. In some examples, the vehicle 802 can have a single drive module 814. In at least examples, the drive module(s) 814 may include one or more sensor systems to detect conditions of the drive module(s) 814 and/or the surroundings of the vehicle 802. By way of example and not limitation, the sensor system(s) can include cameras or other image sensors, ultrasonic sensors to acoustically detect objects in the surroundings of the drive module, LIDAR sensors, radar sensors, etc. Some sensors, such as the wheel encoders can be unique to the drive module(s) 714. In some cases, the sensor system(s) on the drive module(s) 814 can overlap or supplement corresponding systems of the vehicle 802 (e.g., sensor system(s) 806).

The drive module(s) 814 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.).

In various examples, one or more of the sensor system(s) described herein may send sensor data regarding any of the vehicle floor areas herein to the vehicle computing device 804 to analyze and determine whether any waste or debris may be stuck or lodged in the perforations 112a or 114a of the vehicle floor area. If the vehicle computing device 804 determines, based upon the received vehicle floor area sensor data, that solid waste or liquid waste may be lodged in one of the perforations 112a or 114a, the computing device 804 may then communicate, e.g., via the one or more communication connection(s) 810 (described herein), with the drive module(s) 814 (described herein) to activate the suspension system of the drive module(s) 814, e.g., activate hydraulic and/or pneumatic component(s), to try to dislodge the debris. In certain examples, the activation may occur only at appropriate times, e.g., when the vehicle 802 is stopped or when no passengers are inside the vehicle. The movement or vibrations caused by the activated suspension system may dislodge the debris from the perforations 112a or 114b, thereby maintaining a clean upper surface of the vehicle floor area, e.g., a clean top surface of the mat layer 112. In various examples, the activated suspension system of drive module 814 may be deactivated (i) after a certain period of time has elapsed after the vehicle computing device 804 has activated the suspension system, or (ii) after the vehicle computing device 804 determines that no debris is lodged in the perforations based upon sensor data from the sensor system(s), e.g., sensor data from the image capture device or camera, regarding the vehicle floor area. Alternatively or additionally, the vehicle computing device 804 may include a cleaning or waste management cycle. In some examples, the waste management cycle may periodically cause the drive module(s) 814 to activate the suspension system to try to dislodge any waste or debris that may be lodged in the perforations 112a or 114b. Such periodic activation of the suspension system in accordance with the waste management cycle may occur according to any suitable schedule. For example, the waste management cycle may activate the suspension system once per day at a specific time, once per week at a specific time, after a certain number of miles have been driven and the vehicle has stopped, after a certain number of passengers have utilized the vehicle and the vehicle is stopped, or anytime it is determined that no passengers are inside the vehicle. In various examples, the waste management cycle may alternatively or additionally cause the drive module(s) 814 to navigate the vehicle to a location where the vehicle will move along a bumpy surface or road to try to dislodge any waste debris that may be stuck in the perforations 112a or 114b. Such waste management cycle may alternatively or additionally cause the drive module(s) 814 to navigate the vehicle to a location where any debris lodged in the perforations 112a or 114b (or in any of the collection receptacle(s) described herein) may be removed manually or automatically. In various examples, sensed data from one or more of the sensor system(s) may alternatively or additionally be used to cause the drive module(s) 814 to navigate the vehicle to a location where the vehicle will move along a bumpy surface or road to try to dislodge any waste debris that may be lodged in the perforations 112a or 114b.

Additionally, the drive module(s) 814 may include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 814. Furthermore, the drive module(s) 814 may also include one or more communication connection(s) that enable communication by the respective drive module with one or more other local or remote computing device(s).

In at least examples, the direct connection 812 may provide a physical interface to couple the one or more drive module(s) 814 with the body of the vehicle 802. For example, the direct connection 812 may allow the transfer of energy, fluids, air, data, etc. between the drive module(s) 814 and the vehicle.

In at least examples, the localization component 820, the perception component 822, the planning component 824, and the one or more system controllers 826, and various components thereof, may process sensor data, as described above, and may send their respective outputs, over the one or more network(s) 844, to the computing device(s) 836.

In some examples, the vehicle 802 may send sensor data to the computing device(s) 836 via the network(s) 844. In some examples, the vehicle 802 may receive sensor data from the computing device(s) 836 and/or from remote sensor systems 846 via the network(s) 744. The sensor data may include raw sensor data and/or processed sensor data and/or representations of sensor data. In some examples, the sensor data (raw or processed) may be sent and/or received as one or more log files.

The computing device(s) 836 may include processor(s) 848 and a memory 834 configured to store data. The processor(s) 816 of the vehicle 802 and the processor(s) 848 of the computing device(s) 836 may be any suitable processor capable of executing instructions to process data and perform operations as described herein.

Memory 818 and 834 are examples of non-transitory computer-readable media. The memory 818 and 834 may store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information.

It should be noted that while FIG. 8 is illustrated as a distributed system, in alternative examples, components of the vehicle 802 may be associated with the computing device(s) 836 and/or components of the computing device(s) 836 may be associated with the vehicle 802. That is, the vehicle 802 may perform one or more of the functions associated with the computing device(s) 836, and vice versa.

EXAMPLE CLAUSES

A: A vehicle comprising: a body comprising a floor support; a floor comprising: a rigid substrate attached to and positioned at least partially above the floor support, the rigid substrate comprising substrate perforations, and a mat attached to and positioned at least partially above the rigid substrate, the mat comprising mat perforations substantially aligned with the substrate perforations; and a first collection tray supported by the floor support at a first lateral side of the body and positioned at least partially below the rigid substrate such that solid waste or fluid waste can fall through the mat perforations and the substrate perforations onto the first collection tray for removal from the first collection tray; and a second collection tray supported by the floor support at a second lateral side of the body and positioned at least partially below the rigid substrate such that solid waste or fluid waste can fall through the mat perforations and the substrate perforations onto the second collection tray for removal from the second collection tray.

B: A vehicle as paragraph A describes, wherein: each of the mat perforations comprise a diameter, the diameter of each mat perforation having a range between 0.5 mm to 2.0 mm.

C: A vehicle as paragraph A describes, wherein: the floor support comprises: a first support guide positioned at the first lateral side of the body, a second support guide positioned at the first lateral side of the body longitudinally opposite the first support guide, a third support guide positioned at the second lateral side of the body, and a fourth support guide positioned at the second lateral side of the body longitudinally opposite the third support guide, and wherein: the first collection tray supported by the first and second support guides, and the second collection tray supported by the third and fourth support guides.

D: A vehicle as paragraph C describes, wherein: the first support guide comprises a first laterally extending rail, the second support guide comprises a second laterally extending rail longitudinally opposite the first laterally extending rail, and the third support guide comprises a third laterally extending rail, the fourth support guide comprises a fourth laterally extending rail longitudinally opposite the third laterally extending rail, and wherein: the first collection tray comprises: a first support structure movable within and supported by the first laterally extending rail, and a second support structure movable within and supported by the second laterally extending rail; and the second collection tray comprises: a third support structure movable within and supported by the first laterally extending rail, and a fourth support structure movable within and supported by the second laterally extending rail.

E: A vehicle as paragraph A describers, wherein: the first lateral side of the body comprises a side door end portion, the second lateral side of the body comprises a side door end portion, and the floor comprises: a first lateral panel attached to the side door end portion of the first lateral side of the body, the first lateral panel comprising a longitudinally extending slot, and a second lateral panel attached to the side door end portion of the second lateral side of the body, the second lateral panel comprising a longitudinally extending slot; and further comprising: a first door coupled to the first lateral panel such that the first door is (i) openable so the first collection tray can be removed from the longitudinally extending slot of the first lateral panel, and (ii) closable so the first collection tray is hidden from view by at least the first door; and a second door coupled to the first lateral panel such that the second door is (i) openable so the second collection tray can be removed from the longitudinally extending slot of the second lateral panel, and (ii) closable so the second collection tray can be hidden from view by at least the second door.

F: A vehicle as paragraph A describes, further comprising: a suspension system; and a computing device configured to activate the suspension system, according to a waste management cycle or sensed data, to try to dislodge any solid waste or liquid waste that may be lodged in the mat perforations or substrate perforations.

G. A vehicle floor area comprising: a body; a floor attached to and positioned at least partially above the body, the floor comprising floor perforations; and a collection receptacle supported by the body, the collection receptacle positioned at least partially below the floor so that solid waste or liquid waste can fall through the floor perforations onto the collection receptacle for removal from the collection receptacle.

H: A vehicle floor area as paragraph G describes, wherein: the body comprises: a first lateral side comprising a side door end portion, and a second lateral side opposite the first lateral side, the second lateral side comprising a side door end portion; and the collection receptacle comprises: a first collection bin supported by and positioned at the side door end portion of the first lateral side, and a second collection bin supported by and positioned at the side door end portion of the second lateral side.

I: A vehicle floor area as paragraph G describes, wherein: the body comprises: a first lateral side, and a second lateral side opposite the first lateral side; and wherein: the collection receptacle comprises: a first collection tray supported by and removable from the first lateral side of the body, and a second collection tray supported by and removable from the second lateral side of the body.

J: A vehicle floor area as paragraph G describes, wherein: the floor comprises: a top layer, and a bottom substrate attached to the top layer and positioned at least partially below the top layer, and the floor perforations comprise top layer perforations in the top layer and substrate perforations in the bottom substrate.

K: A vehicle floor area as paragraph J describes, wherein: the top layer perforations are substantially aligned with the substrate perforations, the top layer perforations comprise a diameter having a range between 0.5 mm to 2.0 mm, and the substrate perforations comprise a diameter having a range between 0.5 mm to 4.0 mm.

L: A vehicle floor area as paragraph J describes, wherein: each of the top layer perforations comprise a size, each of the substrate perforations comprise a size, and the size of each top layer perforation is smaller than the size of each substrate perforation.

M: A vehicle floor area as paragraph J describes, wherein the bottom substrate is bonded to the top layer at locations between each of the floor perforations.

N: A vehicle floor area as paragraph G describes, wherein: the body comprises: a first lateral side comprising a side door end portion, a second lateral side opposite the first lateral side and comprising a side door end portion, and wherein: the floor comprises: a first lateral panel attached to the side door end portion of the first lateral side, the first lateral panel comprising a longitudinally extending slot, and a second lateral panel attached to the side door end portion of the second lateral side, the second lateral panel comprising a longitudinally extending slot, and wherein: the collection receptacle comprises: a first collection tray insertable into the longitudinally extending slot in the first lateral panel, and a second collection tray insertable into the longitudinally extending slot of the second lateral panel.

O: A vehicle floor area as paragraph N describes, further comprising: a door hingably attached to the first lateral panel to provide access to the longitudinally extending slot of the first lateral panel for insertion and removal of the first collection tray; and a door hingably attached to the second lateral panel to provide access to the longitudinally extending slot of the second lateral panel for insertion and removal of the second collection tray.

P: A vehicle floor area as paragraph G describes, wherein: the body comprises: a first lateral side comprising a side door end portion, a second lateral side opposite the first lateral side and comprising a side door end portion, and a center located midway between the first lateral side and the second lateral side, and a height that increases from (i) the side door end portion of the first lateral side to the center of the body, and (ii) the side door end portion of the second lateral side to the center of the body.

Q: A vehicle floor area as paragraph P describes, wherein: the collection receptacle comprises: a first collection bin supported by and positioned at the side door end portion of the first lateral side, and a second collection bin supported by and positioned at the side door end portion of the second lateral side; and wherein: the floor perforations are substantially aligned with (i) the position of the first collection bin at the side door end portion of the first lateral side, and (ii) the position of the second collection bin at the side door end portion of the second lateral side.

R: A vehicle floor area as paragraph G describes, wherein: the body comprises: a first lateral side comprising a side door end portion, a second lateral side opposite the first lateral side and comprising a side door end portion, and a center located between the first lateral side and the second lateral side, and wherein: the floor comprises a height that increases from (i) the side door end portion of the first lateral side to the center of the body, and (ii) the side door end portion of the second lateral side to the center of the body.

S: A vehicle floor area as paragraph G describes, wherein: the floor comprises: a first lateral side comprising a side door end portion, a second lateral side opposite the first lateral side and comprising a side door end portion, a first lateral panel attached to the side door end portion of the first lateral side, and a second lateral panel attached to the side door end portion of the second lateral side, and at least one of (i) the first lateral panel comprises a gas opening configured to receive a negative pressure to remove any solid waste or liquid that has fallen onto the collection receptacle, or (ii) the second lateral panel comprises a gas opening configured to receive a negative pressure to remove any solid waste or liquid waste that has fallen onto the collection receptacle.

T: A vehicle comprising: a body; a floor comprising: a top layer comprising top layer perforations, and a bottom substrate attached to the top layer and positioned at least partially below the top layer, the bottom substrate comprising substrate perforations; a collection receptacle supported by the body, the collection receptacle positioned at least partially below the floor so that solid waste or liquid waste can fall through the top layer perforations and the substrate perforations onto the collection receptacle for removal from the collection receptacle; and a computing device configured to navigate the vehicle, according to a waste management cycle or sensed data, to a location where the vehicle will move along a bumpy road to try to dislodge any solid waste or liquid waste that may be stuck in the top layer perforations or the substrate perforations.

While the example clauses described above are described with respect to one particular implementation, it should be understood that, in the context of this document, the content of the example clauses may be implemented via a method, device, system, computer-readable medium, and/or another implementation. Additionally, any of examples A-T may be implemented alone or in combination with any other one or more of the examples A-T.

What is claimed is:
1. A vehicle floor area comprising:
a body;
a floor attached to and positioned at least partially above the body, the floor comprising:

a top layer comprising top layer perforations, the top layer perforations comprising a diameter having a range between 0.5 mm to 2.0 mm, and a bottom substrate attached to the top layer and positioned at least partially below the top layer, the bottom substrate comprising substrate perforations substantially aligned with the top layer perforations, the substrate perforations comprising a diameter having a range between 0.5 mm to 4.0 mm; and a collection receptacle supported by the body, the collection receptacle positioned at least partially below the floor so that solid waste or liquid waste can fall through the top layer perforations and the substrate perforations onto the collection receptable for removal from the collection receptacle.

2. The vehicle floor area of claim 1, wherein:
the body comprises:
   a first lateral side comprising a side door end portion, and
   a second lateral side opposite the first lateral side, the second lateral side comprising a side door end portion; and
the collection receptacle comprises:
   a first collection bin supported by and positioned at the side door end portion of the first lateral side, and
   a second collection bin supported by and positioned at the side door end portion of the second lateral side.

3. The vehicle floor area of claim 1, wherein:
the body comprises:
   a first lateral side, and
   a second lateral side opposite the first lateral side; and
the collection receptacle comprises:
   a first collection tray supported by and removable from the first lateral side of the body, and
   a second collection tray supported by and removable from the second lateral side of the body.

4. The vehicle floor area of claim 1, wherein the bottom substrate is bonded to the top layer at locations between each of the perforations.

5. The vehicle floor area of claim 1, wherein:
the body comprises:
   a first lateral side comprising a side door end portion,
   a second lateral side opposite the first lateral side and comprising a side door end portion, and
the floor comprises:
   a first lateral panel attached to the side door end portion of the first lateral side, the first lateral panel comprising a longitudinally extending slot, and
   a second lateral panel attached to the side door end portion of the second lateral side, the second lateral panel comprising a longitudinally extending slot, and
the collection receptacle comprises:
   a first collection tray insertable into the longitudinally extending slot in the first lateral panel, and
   a second collection tray insertable into the longitudinally extending slot of the second lateral panel.

6. The vehicle floor area of claim 5, further comprising:
a door hingably attached to the first lateral panel to provide access to the longitudinally extending slot of the first lateral panel for insertion and removal of the first collection tray; and
a door hingably attached to the second lateral panel to provide access to the longitudinally extending slot of the second lateral panel for insertion and removal of the second collection tray.

7. The vehicle floor area of claim 1, wherein:
the body comprises:
   a first lateral side comprising a side door end portion,
   a second lateral side opposite the first lateral side and comprising a side door end portion, and
   a center located midway between the first lateral side and the second lateral side, and
   a height that increases from (i) the side door end portion of the first lateral side to the center of the body, and (ii) the side door end portion of the second lateral side to the center of the body.

8. The vehicle floor area of claim 7, wherein:
the collection receptacle comprises:
   a first collection bin supported by and positioned at the side door end portion of the first lateral side, and
   a second collection bin supported by and positioned at the side door end portion of the second lateral side; and
the top layer perforations and the substrate perforations are substantially aligned with (i) the position of the first collection bin at the side door end portion of the first lateral side, and (ii) the position of the second collection bin at the side door end portion of the second lateral side.

9. The vehicle floor area of claim 1, wherein:
the body comprises:
   a first lateral side comprising a side door end portion,
   a second lateral side opposite the first lateral side and comprising a side door end portion, and
   a center located between the first lateral side and the second lateral side, and
the floor comprises a height that increases from (i) the side door end portion of the first lateral side to the center of the body, and (ii) the side door end portion of the second lateral side to the center of the body.

10. The vehicle floor area of claim 1, wherein:
the floor comprises:
   a first lateral side comprising a side door end portion,
   a second lateral side opposite the first lateral side and comprising a side door end portion, and
   a first lateral panel attached to the side door end portion of the first lateral side, and
   a second lateral panel attached to the side door end portion of the second lateral side, and
   at least one of (i) the first lateral panel comprises a gas opening configured to receive a negative pressure to remove any solid waste or liquid that has fallen onto the collection receptacle, or (ii) the second lateral panel comprises a gas opening configured to receive a negative pressure to remove any solid waste or liquid waste that has fallen onto the collection receptacle.

11. A vehicle floor area comprising:
a body comprising:
   a first lateral side, and
   a second lateral side opposite the first lateral side; and
a floor attached to and positioned at least partially above the body, the floor comprising floor perforations; and
a collection receptacle supported by the body, the collection receptacle positioned at least partially below the floor so that solid waste or liquid waste can fall through the floor perforations onto the collection receptable for removal from the collection receptacle, the collection receptacle comprising:
   a first collection tray supported by and removable from the first lateral side of the body, and a second collection tray supported by and removable from the second lateral side of the body.

12. The vehicle floor area of claim 11, wherein the floor perforations comprise:
   top layer perforations, each of the top layer perforations comprise a size, and
   substrate perforations substantially aligned with the top layer perforations, each of the substrate perforations comprise a size, and wherein
   the size of each top layer perforation is smaller than the size of each substrate perforation.

13. A vehicle floor area comprising:
   a body comprising:
      a first lateral side comprising a side door end portion,
      a second lateral side opposite the first lateral side and comprising a side door end portion, and
      a center located between the first lateral side and the second lateral side;
   a floor attached to and positioned at least partially above the body, the floor comprising floor perforations and a height that increases from (i) the side door end portion of the first lateral side to the center of the body, and (ii) the side door end portion of the second lateral side to the center of the body; and
   a collection receptacle supported by the body, the collection receptacle positioned at least partially below the floor so that solid waste or liquid waste can fall through the floor perforations onto the collection receptable for removal from the collection receptacle.

\* \* \* \* \*